(12) United States Patent
Currie et al.

(10) Patent No.: US 8,340,898 B2
(45) Date of Patent: Dec. 25, 2012

(54) SYSTEM AND METHOD FOR IDENTIFYING PORTIONS OF ROADS

(75) Inventors: Robert Eldredge Currie, Santa Cruz, CA (US); Assimakis Tzamaloukas, San Jose, CA (US)

(73) Assignee: Dash Navigation, Inc., Sunnyvale, CA (US)

( * ) Notice: Subject to any disclaimer, the term of this patent is extended or adjusted under 35 U.S.C. 154(b) by 0 days.

(21) Appl. No.: 12/887,452

(22) Filed: Sep. 21, 2010

(65) Prior Publication Data

US 2011/0010091 A1 Jan. 13, 2011

Related U.S. Application Data

(63) Continuation of application No. 11/827,747, filed on Jul. 13, 2007, now Pat. No. 7,801,675.

(51) Int. Cl.
*G01C 21/00* (2006.01)
*G08G 1/123* (2006.01)

(52) U.S. Cl. ........ 701/409; 701/400; 701/431; 701/468; 701/527; 701/533; 340/993

(58) Field of Classification Search ........... 701/200, 701/201, 202, 204, 208, 209, 211, 213, 409, 701/400, 527, 465, 533, 428, 431, 468; 455/456.1, 455/456.6; 340/993
See application file for complete search history.

(56) References Cited

U.S. PATENT DOCUMENTS

| | | | |
|---|---|---|---|
| 5,285,391 A * | 2/1994 | Smith et al. .................. 701/200 | |
| 5,426,780 A | 6/1995 | Gerull | |
| 5,513,110 A | 4/1996 | Fujita et al. | |
| 5,659,476 A * | 8/1997 | LeFebvre et al. ............ 701/201 | |
| 6,029,173 A | 2/2000 | Meek et al. | |
| 6,058,350 A | 5/2000 | Ihara | |
| 6,192,314 B1 * | 2/2001 | Khavakh et al. ............. 701/209 | |
| 6,216,086 B1 | 4/2001 | Seymour et al. | |
| 6,278,939 B1 | 8/2001 | Robare et al. | |
| 6,438,561 B1 * | 8/2002 | Israni et al. ........................... 1/1 | |
| 6,487,495 B1 * | 11/2002 | Gale et al. .................... 701/209 | |
| 6,898,516 B2 | 5/2005 | Pechatnikov et al. | |
| 6,904,360 B2 | 6/2005 | Pechatnikov et al. | |
| 6,941,220 B2 * | 9/2005 | Le et al. ....................... 701/208 | |
| 7,050,905 B2 | 5/2006 | Nemeth | |
| 7,660,666 B2 * | 2/2010 | Finn et al. .................... 701/208 | |
| 2002/0161513 A1 * | 10/2002 | Bechtolsheim et al. ...... 701/208 | |
| 2002/0174124 A1 | 11/2002 | Haas | |
| 2003/0033083 A1 | 2/2003 | Nakashima et al. | |
| 2003/0130789 A1 | 7/2003 | McDonough | |
| 2003/0187573 A1 | 10/2003 | Agnew et al. | |

(Continued)

OTHER PUBLICATIONS

EP 08794487.2—Jul. 2, 2010 Search Report.

(Continued)

*Primary Examiner* — Dalena Tran
*Assistant Examiner* — Jamie Figueroa
(74) *Attorney, Agent, or Firm* — Novak Druce + Quigg LLP (57) ABSTRACT

A system and method splices into, or replaces routes identified based on road geometry with routes taken by the same user or other users to create alternate routes that may be selected by a user to display, for example, on a map or for which driving directions can be displayed. Communication of routes traveled by different devices may be received from a server or from another device. A naming convention for road segments and ordered paths of road segments is described.

20 Claims, 6 Drawing Sheets

U.S. PATENT DOCUMENTS

| | | | |
|---|---|---|---|
| 2004/0073361 A1* | 4/2004 | Tzamaloukas et al. | 701/210 |
| 2004/0220728 A1* | 11/2004 | Cayford | 701/209 |
| 2004/0236498 A1* | 11/2004 | Le et al. | 701/200 |
| 2005/0071081 A1 | 3/2005 | Hirose et al. | |
| 2005/0079878 A1* | 4/2005 | Smith et al. | 455/456.5 |
| 2005/0107993 A1* | 5/2005 | Cuthbert et al. | 703/2 |
| 2005/0137791 A1 | 6/2005 | Agrawala et al. | |
| 2005/0181806 A1* | 8/2005 | Dowling et al. | 455/456.1 |
| 2005/0209774 A1* | 9/2005 | Finlay | 701/208 |
| 2006/0031007 A1 | 2/2006 | Agnew et al. | |
| 2006/0184322 A1* | 8/2006 | Kim | 701/211 |
| 2006/0276201 A1* | 12/2006 | Dupray | 455/456.1 |
| 2007/0038362 A1* | 2/2007 | Gueziec | 701/117 |
| 2007/0118278 A1* | 5/2007 | Finn et al. | 701/208 |
| 2007/0208498 A1* | 9/2007 | Barker et al. | 701/117 |
| 2008/0010011 A1* | 1/2008 | Glaza | 701/209 |
| 2008/0071465 A1* | 3/2008 | Chapman et al. | 701/117 |

OTHER PUBLICATIONS

Office Action mailed Aug. 8, 2012, in corresponding Canadian patent application No. 2,691,960.

* cited by examiner

SYSTEM AND METHOD FOR IDENTIFYING PORTIONS OF ROADS

CROSS-REFERENCE TO RELATED APPLICATIONS

This application is a continuation of U.S. application Ser. No. 11/827,747, filed Jul. 13, 2007 now U.S. Pat. No. 7,801, 675, entitled "System and Method of Identifying Portions of Roads, which is related to U.S. application Ser. No. 11/827, 887 entitled, "System and Method for Sharing User-Identified Routes" and U.S. application Ser. No. 11/827,826 entitled, "System and Method for Providing Shared Information About Traveled Road Segments", all having the same assignee as the present application and each of which are incorporated herein by reference in their entireties.

FIELD OF THE INVENTION

The present invention is related to computer software and more specifically to computer software for navigation systems.

BACKGROUND OF THE INVENTION

Conventional navigation systems propose one or more routes to a destination, allow the user to select from the proposed routes and then direct the user along the selected route. Conventional algorithms that are used to identify a route tend to focus on road geometry, identifying a path using major roads such as large streets and freeways, and then direct the user from the user's location to the major road path and then from the part of the major road path nearest the destination to the destination.

However, there may be many reasons why that route is suboptimal for that user. For example, there may be a bottleneck at an artery that could be avoided through a side street that the routing algorithm wouldn't ordinarily select. In another example, the user may prefer a more scenic route, or a route that avoids freeways, or one that avoids left hand turns or one that avoids taking the user through a downtown area.

Identifying the types of routes that would appeal to each user could take countless hours to identify the alternative routes, and would require constant updating, for example as bottlenecks change from one location to the next, making the updated supply of a wide variety of routes that would appeal to different types of users prohibitively expensive to provide.

Because conventional navigation systems can operate over expensive cellular networks, any solution to this problem must use relatively compact amounts of data. It can be further desirable to reduce communication costs, such as may be incurred between a device and a server.

It can also be desirable to name roads and their portions referred to as road segments in a manner that does not require significant change as new roads or segments to existing roads are added. It can be further desirable to communicate a path of ordered contiguous road segments (including nearly contiguous road segments) in a compact manner.

What is needed is a system and method that can provide the user with routes that appeal to that user's needs at the time the route is provided, can change in reaction to changes in road characteristics, and differ from the conventional routes that are road geometry based, while limiting the data transfers required.

SUMMARY OF INVENTION

A system and method identifies a route taken by a user, for example, by correlating road segment identifiers corresponding to position information recorded by a GPS receiver, stores the route, and reports the route to the server if the route differs from a conventionally-identified route. The reporting may be done using shorthand notation, for example by transforming (e.g. hashing) the segment identifiers of the route taken, or using other techniques to send data that is less than what would otherwise be required to send the segment identifiers of each segment traveled in the route. The server records the fact that the route was taken and either the server or the device in the car recording the route attempts to identify the reason that route was taken based on characteristics of the user (e.g. believed to always take the fastest route, or most scenic route or a route that avoids freeways or avoids any major road at night), the time of day (e.g. weekday morning route implies the usually fastest route was taken) or other type of characteristic (e.g. user is not near his home or work and might not know the best route). If the device identifies the reason for the route, the device provides the reason to the server.

If the server has not yet received that transformation of the route, the server requests the identifiers of the segments corresponding to that route, and system and method provides the individual identifiers. The next time the route is taken and reported, the server will not need to request the segment identifiers.

The device recording the route not only stores the route for potential later use, but also receives routes taken by other users most frequently, for different types of trips (e.g. speediest, most scenic, etc.) at different times and types of days. All such routes are stored in the device's route cache for use by that device.

When a different user requests a route, the mobile device identifies one or more type of route the user may desire for that time and type of day, and identifies whether a route previously taken or otherwise stored by the device can be used for that type that is at least near the source and destination, or near a conventional route between that source and destination. If so, that route may be either spliced into the conventional route or presented to the user as a separate route.

If the device does not have such a route appropriate for that type, the device indicates the source and destination of the route to a server and the type or types of route desired. The server will identify one or more routes most frequently taken, or most frequently taken in a recent period for that type and/or other characteristics such as the time and type of day.

When selecting the routes, the system and method may factor the travel time experienced by prior users on a similar type of day and similar time or may ignore such travel time, based on the type of route predicted for the user. Selection may be made from among the routes conventionally chosen, as well as routes supplied by other users as described herein. Thus, the system and method identifies routes actually taken by users whether or not the routes taken were on a list of available routes presented by the system and method, and without asking the user what route they actually took.

Devices may communicate information from their route caches among one another without the use of a server or in addition to using a server. Devices can request specific information, for example, corresponding to that which may be more immediately needed, or they may receive more general information, for example, about the area nearby the device or in its trajectory by providing an indication of the trajectory to such other devices or they may receive specific information requested by different devices.

A naming convention may be used for any of the above activities, with roads separated into one of several types depending on their length, potential length or other characteristics which may or may not be related to length or potential length of the road. The road is then assigned an identifier that is unique to other roads within the same type or within the same type and geographic area, and for which the number of digits or bits in the identifier changes by type. Roads are then divided into segments, the size of which may be the same or be assigned similarly for all types or may differ based on type but be uniform among roads of the same type, with segment identifiers having a number of digits or bits that changes by the type. A road segment identifier may include a type field, a road identifier field and a segment identifier field, and the road segment identifiers may have the same number of digits or bits for all types or they may differ based on the type.

A compact notation for designating a path or route or chain of ordered contiguous road segment identifiers may include the first road segment identifier of the first road and the last road segment identifiers of some or all of the subsequent roads in the path, route or chain, or the first road segment identifiers of some or all of the roads in the path, route or chain and the last road segment identifiers of the last road in the path, route or chain.

DETAILED DESCRIPTION OF A PREFERRED EMBODIMENT

Figure 1:
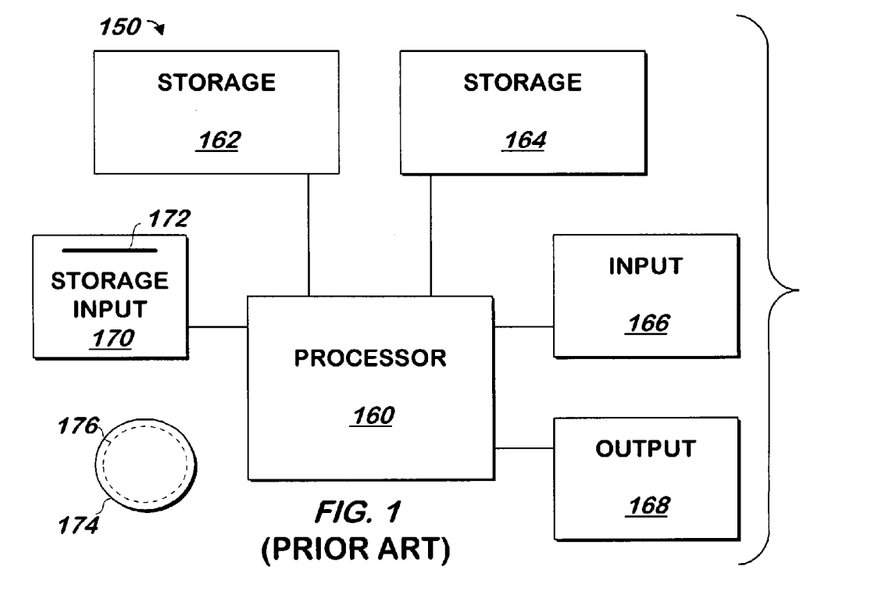
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2A:
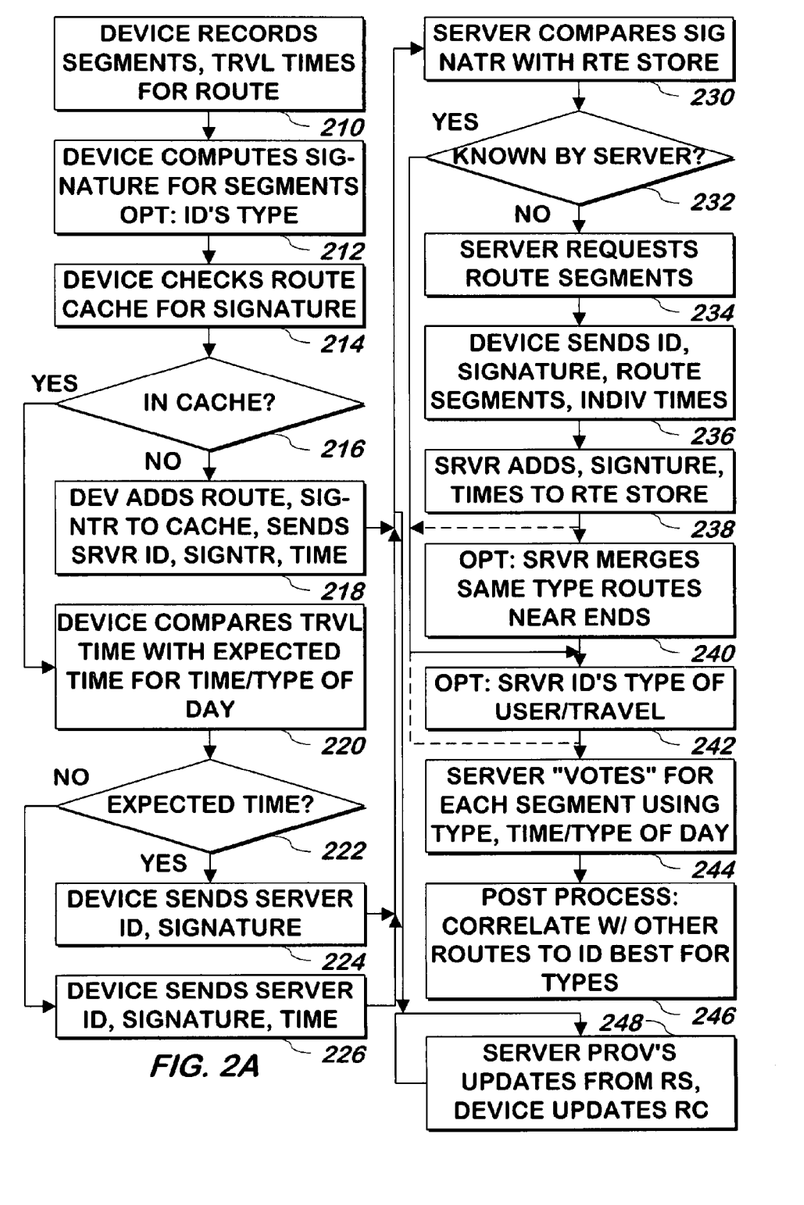
FIG. 2A is a flowchart illustrating a method of recording route information of routes taken by users according to one embodiment of the present invention.

Referring now to FIG. 2, a method of recording route information is shown according to one embodiment of the present invention. A device, such as a conventional GPS-aware navigation device, records 210 road segments and travel times of each segment for a route actually taken. A database may be used to convert latitude and longitude traveled by a user to road segment identifiers. In one embodiment, a route is determined by the device detecting movement between two points, before which and after which no movement is detected for a certain period of time. Each of the road segments has its own identifier.

In one embodiment step 210 is only performed for routes when the device deviates from a conventionally provided navigation route. A conventionally provided navigation route is a route that is provided by navigation device according to conventional methods that prefer major roads as described above. In one embodiment, conventional routes are selected based on road geometry and/or not based on a number of times a route has been traveled by a user requesting a route, different users, or both. Thus, in one embodiment, step 210 may only be performed when a device deviates from such conventional routes, though not necessarily from routes provided by the system and method as described in more detail below. The device does not, however, ask the user what route they took.

The device computes a signature for the segments of the route 212. In one embodiment, a signature is any way of identifying a series of segments, even if that shorthand manner will not produce a unique identifier of those segments. For example, the signature may be a hash of the segment identifiers, but other techniques may be used.

Figure 2B:
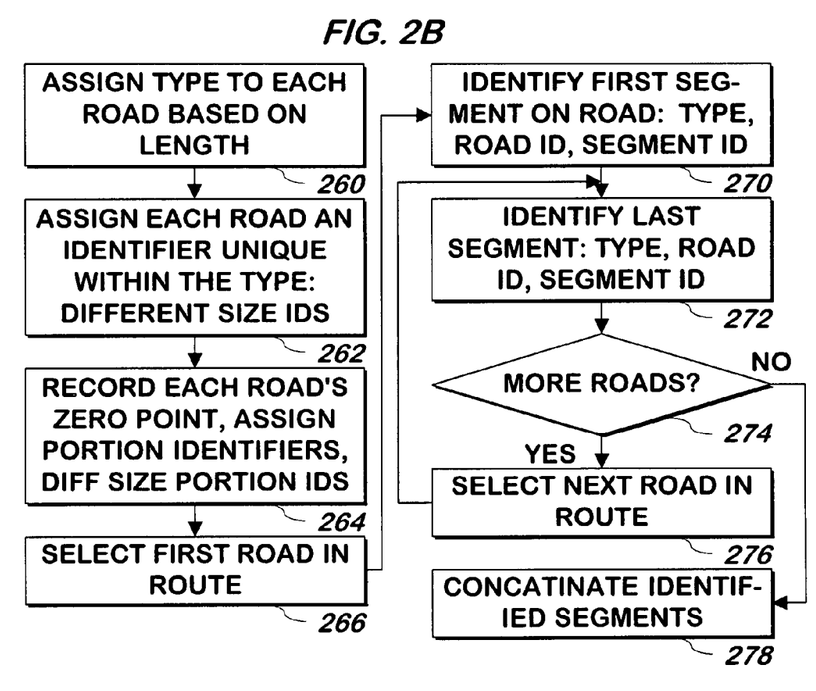
FIG. 2B is a flowchart illustrating a method of identifying road segments and identifying a signature of a route according to one embodiment of the present invention.

In one embodiment, the signature uses a segment naming technique, which will briefly be described with reference to FIG. 2B. FIG. 2B is a flowchart illustrating a method of identifying road segments and identifying a signature of a path according to one embodiment of the present invention. The naming technique involves assigning roads one of two or more types based on the length of the road. In one embodiment, a road may be assigned 260 to a longer-length type if it appears likely that the road would be extended in the next few years to cause it to be long enough to be placed into that longer length type, and in another embodiment, the road is only assigned a type according to its current length. Factors that make it likely that a road would be extended may include the lack of geographic entities (rivers, mountains, Indian reservations etc.) that could impede the extension of the road, or other roads already in place at the approximate location of the most likely extension.

Roads are assigned 262 an identifier that is unique among other roads of the same type. The identifiers of roads with types corresponding to longer roads are shorter in length than the identifiers of roads with types corresponding to shorter roads. This is because there are frequently more shorter roads than longer roads.

The road is then divided into portions, for example, of one meter lengths, and the portion identifiers are assigned extending in one or both directions from a "zero" portion, the placement of which is recorded in a database for each type and road identifier 264. Thus, the portion identifiers that are positive extend in one direction along the road from the zero portion, and portion identifiers that are negative extend in the opposite direction. Other embodiments use positive or negative portion identifiers, with the zero point corresponding to one end or a potential end, which may not exist at the time. The number of bits allocated to portion identifiers is fewer for roads having types corresponding to shorter roads than the number of bits allocated to portion identifiers for roads having types corresponding to longer roads.

The number of bits in the total number of bits used to represent both the road identifier and portion identifier can thus be held at a uniform number of bits for all types of roads, and in one embodiment, that is the case. To decode these identifiers, the type bits are investigated to determine the number of bits of road identifier and segment identifier that remains. As noted, the segment identifier may be signed to indicate direction from the zero segment.

In one embodiment, representation of a road segment thus is a series of bits that include, for example, from let to right, the type identifier, the road identifier and the portion identifier, and this concatenation is used as a segment identifier.

To uniquely identify an ordered series of road segments in a route, the first road is selected 266, and the road segment identifier of the first segment of the selected road is retained 270. The road segment identifier of the last segment of the selected road is retained 272. If there are more roads in the route 274, the next road is selected 276, and the method continues at step 272. If there are no more roads in the route 274, the retained road segment identifiers (consisting of type, road identifier, and segment identifier) are concatenated in the order traveled to form the signature of the route. It is noted that for a route that employs a road, then a different road or roads, and then returns to a road, the instances of the road are treated as two "roads" in the above procedure. It is further noted that instead of the last segments of each road, plus the first segments designating the signature, the first segments of each road, plus the last segment of the last road may be used.

Thus, to record a path from point A on road 1, to point B on road 1, and then from point B on road 1 (where point B is on or very near to an intersection of road 2) to point C on road 2, one would record the segment identifiers of points A, B and C. Such segment identifiers would include the path of all road segments between the recorded segment identifiers.

It is noted that recordation of some segment identifiers may be omitted if they can be reconstructed from the segment identifiers recorded. Thus, a path that runs along road 1 from points A to B, and then along road 2 (which is perpendicular to road 1) from points B to C, and then along road 3 running parallel to road 1 from points C to D, need only record points A, B and D. The path B-C can be inferred from points B and D as being substantially L shaped, and such a sub path may be inferred from any discontinuity when only one such sub path exists.

Thus, the signature in one embodiment, would include the road segment identifiers ABCD or ABD.

In one embodiment, step 212 also includes identifying a reason the user took the route as the route type, as described below with respect to step 242 et. seq.

The device checks its route cache for that signature 214. In one embodiment, the route cache contains information about routes the device has traveled, and information about routes other users have traveled that the device has downloaded, for example from a server. In one embodiment, the route cache is indexed by signature, and thus the routes, times, and signature are all stored associated with one another in the route cache.

If the most recently taken route is in the cache 216, the method continues at step 220. Otherwise 216, the device stores the segment identifiers of the route, the signature, and the travel times of each of the segments or the total travel time of the route into the route cache and adds a vote for each segment corresponding to the route type by appending the current date and time to a circular buffer of dates and times for each of the several possible route types to each segment in the route, and sends the server a device identifier that uniquely identifies the device, and also sends to the server the signature, optionally, the route type, and the total travel time 218. The method continues at step 230.

At step 220, the device compares the travel time of the route with the expected travel time for the time of day and type of day currently in effect 220. The type of day may be nonholiday weekdays, holiday weekdays, and weekends. Other types of days may also be used. If the travel time of the route is equal to or approximately equal to be expected travel time for the route on that time and type of day 222 as stored in the route cache as described above, the device sends the server the device identifier of the device, optionally the route type, and a signature of the route 224, and the method continues at step 230. If the travel time of the route is different from the expected time for that time of day and type of day 222, the device since the server its device identifier, optionally the route type, the signature, and the travel times of each segment or the total travel time 226, and the method continues at step 230.

At step 230, the server compares the signature with its own route store 230. In one embodiment, the route store of the server describes routes taken by many different devices, some or all of which operate as described herein. If the server locates the signature in the route store 232, the method continues at step 242. Otherwise 232, the server requests from the device the individual segment identifiers and travel times 234. The device sends device identifier, the signature, optionally, the route type, identifiers of the route segments, and individual travel times 236. The server receives this information and add the signature, the segment identifiers, and travel times to the route store of the server 238. In one embodiment, after step 238, step 242, or step 244 described below, may be performed. In another embodiment, after step 238, the server makes an attempt to identify other routes that have ends nearby the ends of the route most recently received, and if any such routes are identified, the server may optionally merge two or more routes together into an additional combined route, identifies its signature, and stores the corresponding information for the merged route in the route store as well 240. The method continues at step 244.

As part of step 238, the server and may store the travel time and the current date and time in the route store associated with the route, and use any travel time of the route received to update an average travel time of the route for the time and type of day, for example using a weighted average that weighs most recent travel times more heavily than prior travel times of routes.

In one embodiment, as part of step 242, the server may attempt to identify the type of user using the device, or, more specifically, the type of travel being performed by that user. In one embodiment, there are several types of travel, such as rapid routes, scenic routes, routes that avoid freeways, routes that avoid left-hand turns, or other types of travel which may avoid routes with certain characteristics, prefer routes with certain characteristics or both. The type of user or type of travel for that user may be identified based on the time and type of day, travel patterns of that same user in the past for that same or similar time and/or type of day. The type of user or type of travel (all of which may be referred to as a "type of travel" or "travel type") as described herein) for a time and type of day may be identified by noting which routes the user selects when presented with several, by matching the routes the user takes or prefers at various times and types of days with users who have already been identified as preferring that type of travel or using other techniques. Thus, a user that travels on routes traveled by other users of the same type may be designated as being of that type. Certain routes or users may be designated by a system administrator as scenic or speedy or other types of routes to "seed" the system and facilitate this determination. Other ways of seeding, e.g. initializing, the system may be used.

Other ways of identifying the type of route may be used, without requiring the user to explicitly identify the type of route. For example, a route taken during rush hour on a weekday can be identified as a route that is the fastest. A route near a park or along a parkway that is not the most direct may be identified as scenic. A lengthy route that could use, but avoids, freeways at a time that such freeways are not congested can be identified as a non-freeway route. Users can be identified as preferring routes of a particular type during a time and type of day if that user repeatedly travels on those types of routes during such times and types of days.

In one embodiment, the user of the device may identify the type of routes that user prefers at a registration process or at such time as the user is requesting a route as described in more detail below, and such information may also be used to identify the type of route.

The server "votes" 244 for each segment in the route received using the time and type of day as well as the type of the user, with each segment having storage for votes for each possible type of route for each of several times and types of days. For example, a segment may be voted as one taken by users who frequently take the fastest route, or take the fastest route on a weekday rush hours. A vote may be recorded by recording the device identifier, current date and time at the head of a circular list of such dates and times for example, for that route and that time and type of day, to allow a determination of how current the votes are. It is noted that a segment may appear in multiple routes and the segment vote is only recorded once for the segment in all routes. In the embodiment in which the server identifies the route type, the server provides in response to the receipt of the signature, the route type and the signature to the device, which uses it to vote, in the same manner as the server, for each segment.

The server may attempt to correlate the received route and any merged routes with any number of conventionally provided routes and the alternate routes received as described herein to determine, for example, if the route or merged route is in fact faster than a nearby conventionally provided route and which of several alternate routes are the fastest 246. This may be performed only for segments in the route for which the number of recent votes exceeds a threshold. The correlation may be recorded with the route or segments in the route. The correlation may allow such determinations to be made in advance of the need for such route, to enable such routes to be provided faster than would be possible if the determination was provided at the time the route was requested.

In one embodiment, step 248 includes providing the information from the route store to any number of devices. The information from the route store may be provided whenever the server and the device can communicate using a free or inexpensive (as compared with a cellular connection) connection to allow the relatively large volumes of data from the route store to be provided to the devices, for example, using a free wi-fi connection as part of a separately running process, or in response to communications received from the device or both.

Portions of the route store that correspond to areas the device frequently travels may be provided, so that the entire route store need not be provided to each device. The device may record the last date and time of travel in one of several zones of a metropolitan area, and the last date and time an update of the route store was received for that zone. When a wi-fi or other free or inexpensive communication facility is available, the device may request routes from the route store that pass through any zones in which the device recently traveled, for which the route store is older than a threshold amount of time. The request may be provided separately, or as part of the signature information provided to the server or both.

Any number of devices can perform the steps of FIG. 2A so that the route store in the server will store route information from several different users. As different devices travel through a metropolitan area, the route store and route caches will become populated with a variety of types of routes, with frequently used segments garnering a higher number of recent votes.

Once the routes are stored in the device's route cache or the server's route store, or both of them, the routes can be used to provide route and direction information to the same user or to different users.

Figure 3:
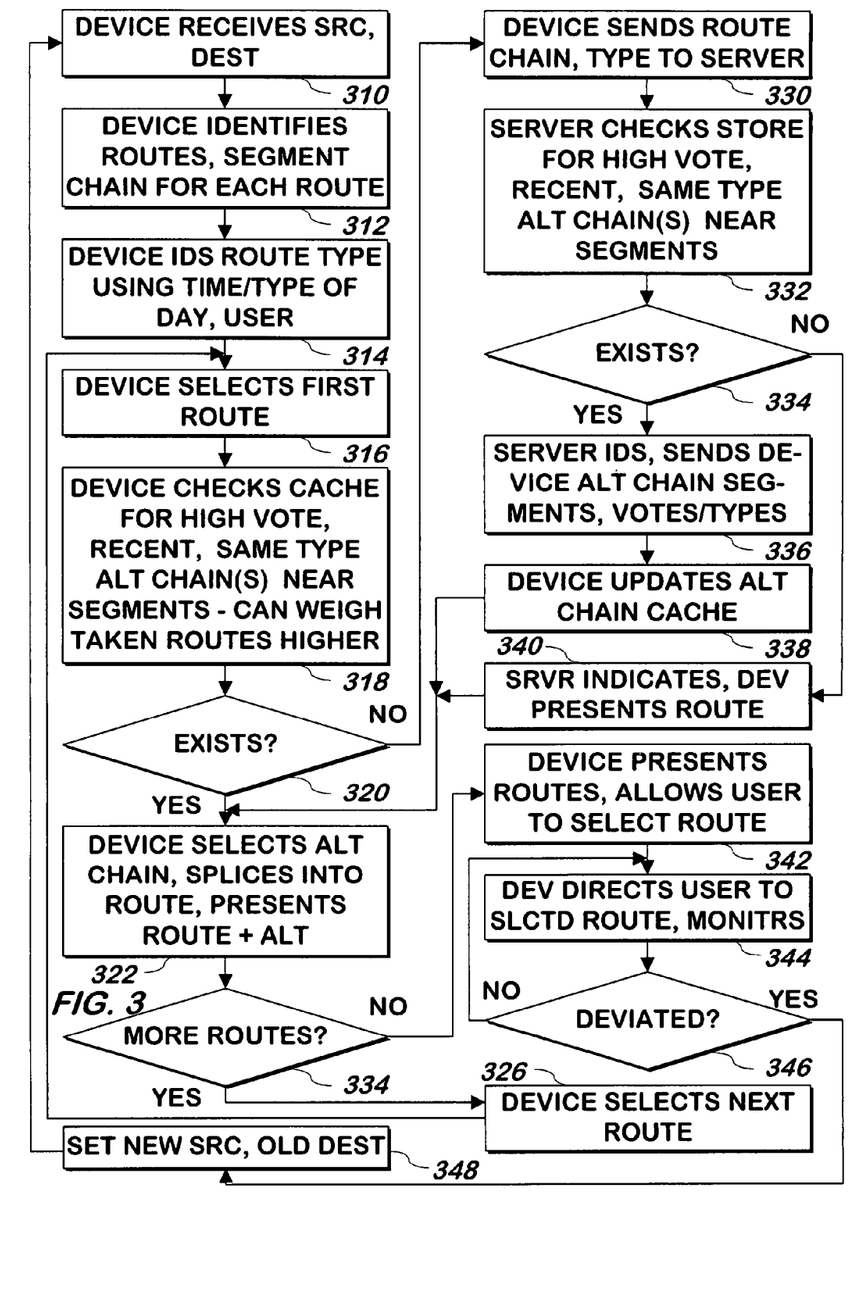
FIG. 3 is a flowchart illustrating a method of utilizing routes taken by users according to one embodiment of the present invention.

Referring now to FIG. 3, a method of displaying routes is shown according to one embodiment of the present invention. A mobile device receives the source and destination for a desired route 310 for example, from a user, after the user identifies himself. In one embodiment, the device is a conventional GPS aware navigation device, in which case the source is identified as the current location of the device, retrieved from a GPS subsystem using conventional techniques. There may be many such devices in cars, or devices may be hand held. The device uses conventional methods to identify routes between the source and the destination, and identifies a route as a chain of ordered segments between the source and destination 312. The conventional methods identify the shortest path of major roads from the source to the destination or points nearby, with certain roads having associated therewith a cost that roughly corresponds to an expected travel time or speed (e.g. freeways can have a lower cost than roads). Paths using non major roads are used to complete the route between the source and destination.

As described herein, conventional methods (e.g. Djikstra's algorithm) are used to identify an initial set of one or more conventional routes, using major roads, with paths to and from the major roads appended to the ends, if necessary, to complete the route. Alternate routes in the route cache or route store may be used to splice into those routes and provide alternatives to the user (the splice may supplement or replace the conventional route). Portions or all of the conventional route may be replaced with some or all of the alternate route, with routes between the conventional route and the ends of the alternate route added if necessary. It is not necessary to operate in this manner, as alternate routes near the source and destination may simply be identified, and the user routed between the endpoints or nearest points of the alternate route and the source and destination. The first technique (splicing into a conventional route) however is described herein.

The device predicts or otherwise identifies the desired route type 314. In one embodiment, the route type is predicted as described above, using the time and type of day, and other route types the user has taken at the same time and type of day. For example, during rush hour on non-holiday weekdays, and the fastest route may be the predicted type if that type of route is the type the user has taken at similar times and types of days. Route types may be predicted using route types associated with other users that the user takes at similar times and types of days. On holidays and weekends, the user may have taken scenic routes, and that type may be the predicted type. Although one predicted route type is described herein, in one embodiment, two or more route types are predicted. In other embodiments, no route types are predicted, and all route types are used instead as the types of alternative route the user may wish to take. In embodiments in which multiple route types are predicted, different alternate routes may be identified for each type, and/or alternate routes may be identified for routes that combine types may be identified: e.g. fastest alternate route that avoids freeways.

In one embodiment, as part of step 316, the predicted route type is displayed and the user is allowed to override it if desired. If the user indicates the user wishes to override the route type predicted, the route type is identified using a user interface asking the user what type of route the user of the device would prefer.

The device selects the first conventionally identified route 316. The device checks the route cache for alternate routes having at least a threshold number of recent votes for the same type as the type or types predicted, and that have one or more segments near one or more of the segments of the selected route 318. An alternate route includes some or all of a series of contiguous segments in a route that has been taken by one other user and that differs from a route that would be identified as one of the conventionally-identified routes. The contiguous segments may be stored in the route cache as described above with reference to FIG. 2. In one embodiment, step 318 includes verifying that the alternate chain corresponds to the type of the route being selected. This may involve, for example, determining whether the estimated travel time for the current time and type of day will be faster than the segments in the conventional route that the alternate route will replace. If not, the alternate chain is not one of the alternate chains identified. In one embodiment, a subset of the segments of a route stored in the route cache as described above are used as the alternate route: only those segments having a number of recent votes above a threshold may be used as an alternate route. The votes used are those corresponding to the route types identified as described above, with votes for each type being treated independently of one another in embodiments in which multiple route types are used.

In one embodiment, instead of selecting segments from routes that have a recent number of votes above a threshold to identify the alternate chains, the segments that are used from the route cache are those corresponding to a highest value of a function of a prediction score and the number of recent votes. The prediction score is higher for those types predicted to be more desired by the user. A threshold number of types or a threshold number of alternate chains are then used based on those with the highest function of prediction score and votes.

In any of these embodiments, votes for segments of previously stored routes that were taken by the user of the device identifying the route may be weighed more heavily than votes for segments not taken by that user. For example, the function used to select one or more alternate chains to splice into the conventionally identified route or routes also includes this weight. If any such alternate chains exist, the device may select the alternate chain or chains that have the highest number of recent votes weighted votes, or function result, and then splices some or all those alternate chains into the selected route 322, either all at once to produce a single alternate route, or one at a time to produce multiple alternate routes. The splice of the alternate chain may involve replacing some or all of the segments of the conventionally identified route with some or all of the segments from each alternate chain identified, and optionally building a path between either or both endpoints or other segment of the alternate chain near the conventionally-identified route and a nearby point of the conventionally-identified route. The path between the endpoint of the chain and the conventional route may be built using the conventional Djikstra's algorithm or any other conventional method to determine which road segments to use to build the path or paths. The net result of splicing one or more alternate chains and any other segments from the path or paths into the conventional route is referred to as an alternate route. In one embodiment, each alternate route would have one or more alternate chains having at least the threshold number of recent votes, weighted number of votes, or function score of the same type. Where more than one type was identified as described above, there may be one or more alternate routes identified for each such type identified. Where all types are used to identify alternate chains, there may be one or more alternate route for each type, provides at least one alternate chain meets any applicable criteria.

The device then presents the original route, and the alternate route, for example, on a map, and may identify the alternate route with the type of route it believed the user desired as part of step 322. The identification of the type of route can allow the device to predict several types or routes or all types of routes, and then present each alternate route with an indication that the route "might be faster" or "can be more scenic", etc. If there are more routes that were identified using the conventional fashion 334, and the device selects the next such conventionally identified route 326, and the method continues at step 316 using that selected conventionally-identified route.

If at step 320, a suitable alternate chain of the identified type or types either has a number of recent votes (or a function result) under a threshold, does not exist, or does not contain a sufficiently high number of votes or function result 320, the device sends the signature of the conventionally identified route and optionally, the type or types of routes for which alternate chains are desired to the server 330. In one embodiment, a signature corresponding to all segments but the segment corresponding to one or both of the source and destination are sent to the server. In one embodiment, the type or types are not sent to the server and the server will process the request as if it contained all route types.

The server receives the signature, identifies the chain from the signature, (requesting the segment identifiers from the device if the signature is not unique) and checks the route store at the server, populated as described in FIG. 3, for alternate chains in the vicinity of the route corresponding to the signature it received with a high number of recent votes or function score for any of the types or all of the types 332. If any such alternate chains exist in the route store 334, the server sends the device the segment identifiers from the alternate route or routes along with the number and date of votes for that segment (in one embodiment the votes are provided for all types, organized by type) and the type or types to which the votes correspond 336. The device updates the route cache using the alternate chain or chains received from the server 338 and the method continues at step 322 using the newly received alternate chains. If no such alternate routes exist in the server's route store 334, the server so indicates, and the device presents the conventional route 340. The method continues at step 334.

When there are no more conventionally identified routes 334, the device allows the user to select one of the routes it has presented 342, with or without the alternate chain or chains spliced thereto, and the device directs the user along the selected route 344, for example using driving directions according to the user's GPS-detected location and a map. As part of step 344, the device monitors the user's location and can determine if the user deviates from the selected route. If such deviation from the selected route is detected 346, the current location is set as the new source (with the destination remaining as the destination) 348, and method continues at step 310 to re-identify the routes from the user's current location. Otherwise 346, the method continues at step 344.

Figure 4:
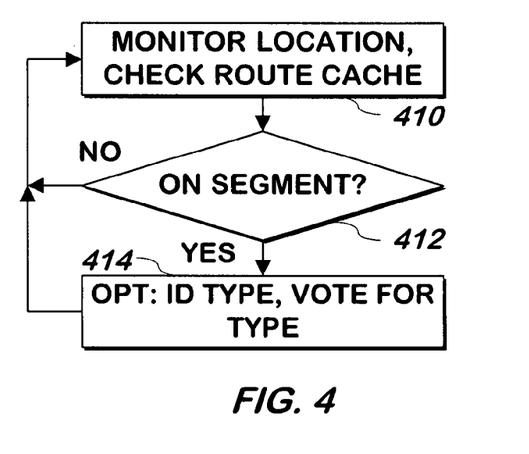
FIG. 4 is a flowchart illustrating a method of updating a route cache according to one embodiment of the present invention.

Referring now to FIG. 4, a method of updating a route cache is shown according to one embodiment of the present invention. A location of a device, such as the device performing the monitoring, is identified, for example, using GPS or other similar signals. The location is converted into a road segment of a conventional navigation map database, and a route cache is checked to determine whether the segment is in the route cache 410. If the segment is in the route cache 412, the type of travel is identified, as described above, and a vote is added to the segment for that type by recording the current date and time, for example in a circular list for the corresponding type and segment 414. The method continues at step 410. Otherwise 412, the method continues at step 410.

Figure 5:
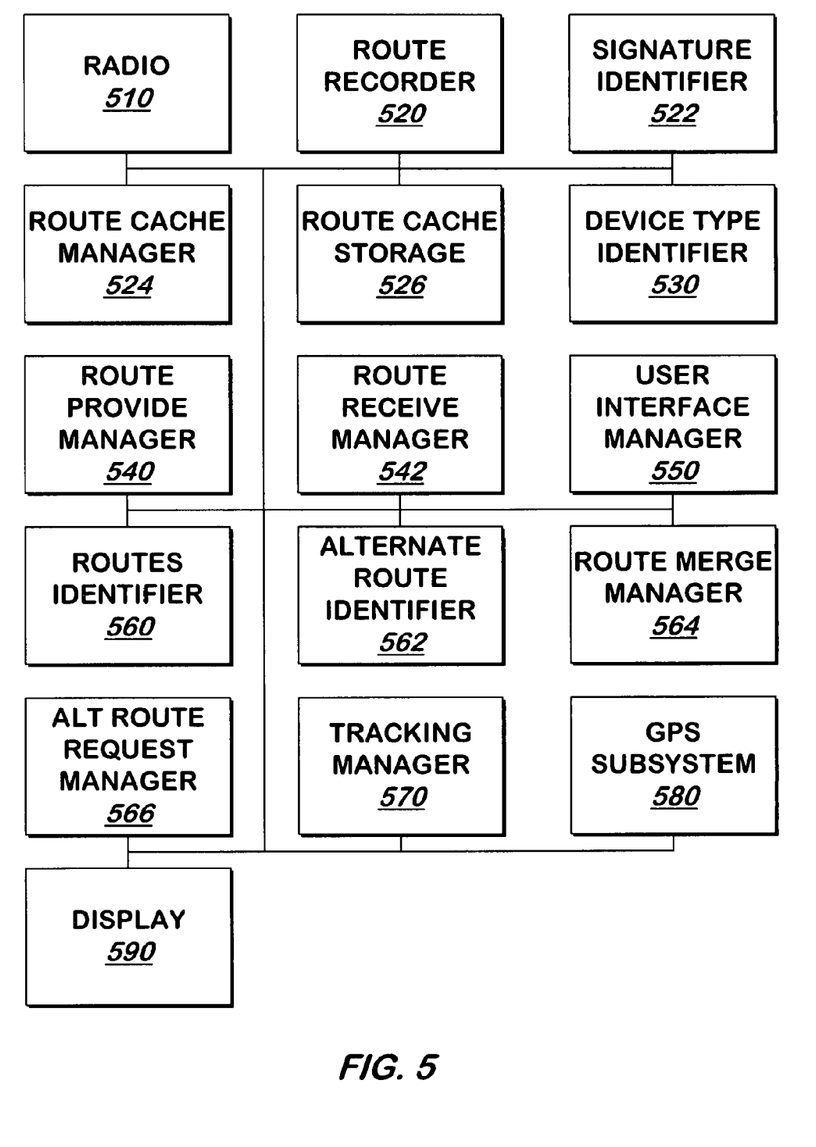
FIG. 5 is a block schematic diagram of a system for recording route information for routes taken by a device and displaying alternate routes in response to routes taken by that device and other devices according to one embodiment of the present invention.
Figure 6:
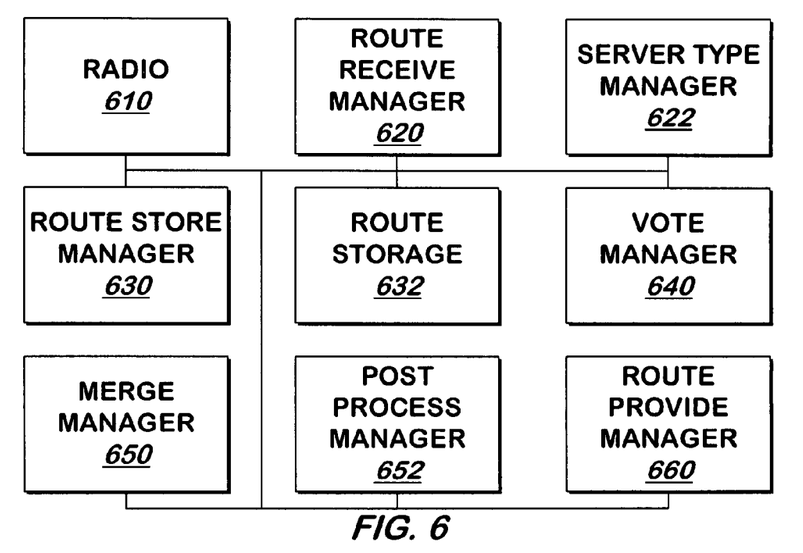
FIG. 6 is a block schematic diagram of a system, such as could be implemented on a server or a device, for storing and serving route information originating from multiple devices according to one embodiment of the present invention.

Referring now to FIGS. 5 and 6, a system for providing routes that incorporate routes taken by a user or other users into a recommended route is shown according to one embodiment of the present invention. FIG. 5 illustrates a mobile device, of which there may be many dozens or hundreds or thousands. FIG. 6 illustrates a server, of which there may be one or more than one, sharing a single route store in one embodiment.

Record the Route

Radios 510 and 610 include conventional radios, including Wi-Fi radios, Cellular radios or both. The Wi-Fi portion may be the default radio, with the cellular portion being used when high priority communications are required during a period in which no Wi-Fi communications are possible or they are determined not to be reliable. Radio 610 may include multiple radios at various places, which are each coupled to a communication interface such as an Ethernet interface running TCP/IP for receiving various communications from the multiple radios. Communications may be relayed from a radio 510 in one device to a radio 510 in any number of different devices and ultimately forwarded to radio 610.

Route recorder 520 continuously or periodically receives location information (latitude and longitude) from GPS subsystem 580, which may include a conventional GPS receiver to identify locations and route recorder 520, and identifies and records the segment identifiers of a route. Route recorder identifies the start and end of a route by determining that no changes to the device's location have occurred for a period of time as described above. Route recorder 520 builds a route record containing the segment identifiers of each segment and the travel times of each segment that was completely traversed as described above, and provides the route record to signature identifier 522 when the end of the route is determined. In one embodiment, route recorder 520 only adds to the route records the identifiers and travel times for segments of the route that differ from segments that would have been identified between the start and end points of the route using a conventional routing algorithm and thus each route may be split into multiple routes when the conventional portion is excluded. Each such remaining route may be treated individually as described herein.

Signature identifier 522 receives the route record and identifies a signature of the route record as described above. Signature identifier 522 stores the signature in the route record and provides the route record to route cache manager 524.

Figure 7:
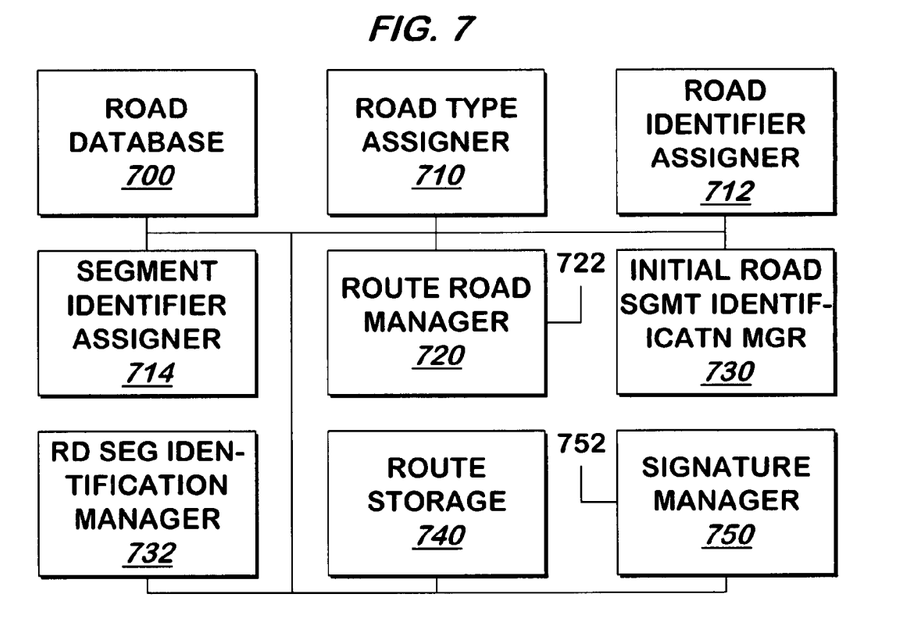
FIG. 7 is a block schematic diagram illustrating a system for naming road segments and identifying a signature of road segments that may be ordered and contiguous according to one embodiment of the present invention.

Referring momentarily to FIG. 7, signature identifier 522 is shown in more detail according to one embodiment of the present invention. A conventional road database 700 containing road names and descriptions of the locations traversed by each road is received. Road type identifier 710 identifies, for all roads or for all roads in a metropolitan area, in road database 700 the type of the road as described above, stores an identifier of the type of the road associated with its name in road database 700 and signals road identifier assigner 712. When signaled, road identifier assigner 712 assigns an identifier to each road in road database 700 that is unique to the roads within the same type, stores the road identifier associated with the road name into road database 700 and signals segment identifier assigner 714. Roads that span metropolitan areas may be assigned the same identifier from one metropolitan area to the next or a conversion table may be maintained by road identifier assigner 712 in road database 700. For each road in road database 700, segment identifiers are assigned, and locations corresponding to each segment identifier are identified as described above by segment identifier assigner 714 when signaled, and stored in road database associated with the road to which the segment corresponds.

The locations traveled in a route are received by route road manager 720 at input 722, route road manager 720 identifies the road segments in the route using road database 700 and provides the road segment identifiers of the segments traveled to initial road segment identification manager 730, which stores the road segment identifier (which includes type, road and segment identifiers) for the initial segment into route storage 740 and provides the remainder of the segment identifiers to road segment identification manager 732. Road segment identification manager 732 stores the last road segment identifier for each road in the route into route storage 740 and signals signature manager 750 upon completion. Road segment identifiers are stored in route storage in the order traveled.

When it receives the signal, signature manager 750 concatenates the road segment identifiers and provides the signature at output 752.

Determine if the Route is in the Route Cache, Compare Travel Times.

Referring again to FIGS. 5 and 6, route cache manager 524 receives the route record and determines if the route is in the route cache stored in route cache storage 526. The comparison may be performed using the signature to determine whether the signature matches the signatures of other routes in the route cache. If not, route cache manager 524 adds the segment identifiers and travel times and the signature as a new route in the route cache in route cache storage 526 and provides a pointer to the route record to route provide manager 540 with an indication that the route is new.

Otherwise, route cache manager 524 compares the travel times with the average travel times for each segment of the matching route for the same type of day and time in the route cache in route cache storage 526 and if the travel times are the same or within a threshold amount of those in the route cache in route cache storage 526 for the time and type of day, route cache manager provides a pointer to the route record to route provide manager 540 with an indication that the travel times are the same.

Otherwise, route cache manager 524 marks the travel times in the route record that are different, and provides a pointer to the route record to route provide manager 524 with an indication that the travel times are different.

In any of the above three cases, route cache manager 524 provides the travel times for each segment and the date and time into the route cache in route cache storage 526 associated with the route for use in computing subsequent averages for the same time and type of day.

Optionally Identify the Type, Provide the Route Information to the Server

When route provide manager 524 receives the route record, route provide manager 524 provides information contained therein to the server according to the indication received with the route record. In one embodiment, before providing the information to the server, route provide manager 524 provides the date and time from the route record to device type manager 530.

When it receives the date and time, device type manager 530 identifies the type of route as described above, for example, using date and time received, or other information as described above. In one embodiment, device type manager 530 signals user interface manager 550 which asks the user for the reason the user took the route, and provides the response to device type manager 530, which identifies that reason as the type of route. In one embodiment, user interface manager 550 may have asked the user to log in at any time before, during or after the route has been traveled, and the user identifier received as part of the log in process is requested and received by device type manager 530 and used to determine the type of route as described above. Device type manager 530 provides the type of route it identifies to route provide manager 524, which adds it to the route record and adds a vote for that type of route by adding the date and time from the route record to a circular buffer for that type and for that time and type of day associated with the route in the route cache in route cache storage 526. In another embodiment, the server identifies the type of travel, and so route provide manager 524 requests the user identifier from user interface manager 550 and provides it in the route record. Such information is sent to the server with the other route information.

If the indication is that the route is new, route provide manager 524 provides the signature of the route record, the date and time, the type and/or user identifier, and/or a device identifier it maintains to radio 510 for transmission to the server. In one embodiment, the travel times of the segments are provided in the order of the segments traveled.

Receive the Signature, Check to See if Route is in Route Store.

Radio 610 of the server receives the signature and travel times and provides them to route receive manager 620. Route receive manager 620 provides the signature to route store manager 630, which determines if a corresponding route is in the route store in route storage 632.

In one embodiment, a corresponding route is in the route store if the signature matches one in the route store In another embodiment, the route is in the route store if some of the segment identifiers in the signature are in a route in the route store. For example, the route may be determined to be in the route store if two or more consecutive segment identifiers in the signature match two or more of the segment identifiers in the signature of a route in the route store. In one embodiment, all but the first and last (or second, and second to last) road segment identifiers in the sequence of road segment identifiers of the received signature must match a signature of a route in the route store for a match to occur.

If route store manager 630 determines that the route is not in the route cache, in one embodiment, route store manager 630 so indicates to route receive manager 620, which so indicates to the sending route provide manager 540 via radios 610 and 510. Route provide manager 540 responds by sending to route receive manager 620 any or all of the segment identifiers of the route from the route record, and the travel times, type of route and/or user identifier, and date and time from the route record. Route receive manager 620 stores this information as a new route in the route store in route storage 632.

In another embodiment, instead of requesting the segment identifiers, route receive manager 620 stores the route and the travel times and date and time received into the route store in route storage 632 as a new route.

If the route is indicated to have travel times similar or identical to those expected for the same type and time of day, route provide manager 524 provides the signature of the route record, the date and time, the type and/or user identifier, and/or the device identifier to radio 510 for transmission to the server but need not provide the travel times. The operation of the system proceeds as described above, with route store manager 630 computing, then re-storing the average travel time as the travel time as of the date and time received. The average travel time may be the current average travel time for the same time and type of day, or it may be the average as stored by the device, which route provide manager may maintain in route storage 632.

If the route is indicated to have travel times not similar or identical to those expected for the same type and time of day, route provide manager 524 provides the signature of the route record, the date and time, the type and/or user identifier, and/or the device identifier, and includes the travel times that were, with place holders for travel times for segments that were similar or identical to those expected for the same type and time of day. The operation of the system proceeds as described above, with route store manager 630 storing either the time specified, or if none is specified, the average travel time for that segment, as the travel time as of the date and time received for each segment in the route. The average travel time may be the current average travel time for the same time and type of day, or it may be the average as stored by the device, which route provide manager may maintain in route storage 632.

In one embodiment, route receive manager 620 provides the user identifier or device identifier and the date and time received as described above, to server type manager 622, which identifies the type of travel or type of travel for that user or device, identified as described above. Information about the user may be identified by server type manager 622 as described herein, for example, from user interface manager 550, to assist server type manager 622 in determining the type of travel. Route receive manager 620 provides this type of travel to route store manager 630 in the embodiment in which none is received from the device, or provides the type of travel received from the device. In another embodiment, route receive manager 620 obtains and provides to route store manager 630 both types, with a confidence score that indicates that both agreed or did not agree, with evaluation of votes described herein using the confidence score in making a determination as to the segments to use as alternate chains. Route store manager 630 stores the date and time received, in a circular buffer in route storage 632 associated with the route for the type of day and time that corresponds to the type of travel, and may store the confidence score in the circular buffer as well. In one embodiment, there is one circular buffer per type of travel and within the type of travel, one circular buffer per type and time of day for each of several times and types of days (e.g. non holiday weekday rush hour, weekend or holiday daytime, weekend or holiday evening, etc.).

In one embodiment, route store manager 630 provides a pointer to the route it stores to merge manager 650. (If no merge manager is used, in one embodiment, route store manager 630 provides the pointer to post process manager 652.) In one embodiment, such a pointer is provided to merge manager 650 if the route is new, and otherwise, the pointer is provided by route store manager 630 to post process manager 652.

When it receives the pointer, merge manager 650 attempts to merge the route to one or more other routes to create a larger, merged route containing some or all of both routes as described above. The smaller routes may be removed from the route store in route storage 632. Merge manager 650 provides a pointer to the route (if not merged) or the merged route to post process manager 652.

When it receives the pointer, post process manager 652 performs the post processing described above, and stores the results in the route store in route storage 632 associated with the route corresponding to the pointer it received.

Automatic Updates.

At any time, route provide manager 660 may provide alternate routes information stored in the route store in route storage 526 as described herein to route receive manager 542 via radios 610, 510. Route receive manager 542 provides such alternate routes information received from other devices to route cache manager 524, which stores any such routes into the route cache in route cache storage 526. Information such as the dates and times corresponding to the types of travel for a route (e.g. the "votes" for the route") may be updated in the route cache by route cache manager 524 even if the route already exists in the route cache. In one embodiment, route provide manager 660 only provides information for routes already stored in the route cache in route cache storage 526 and other nearby routes. The identifiers of devices that have a particular route may be maintained in the route store in route storage 632 by any element that receives the route from a device or provides it to a device as described herein.

Receipt of Routes by a User

At any time, a user may request a route. In one embodiment, the user requests a route by providing to user interface manager 550 an indication of the start and end of the route. The indication may be an address, intersection, a previously named point (e.g. "home"), a pointed to location on a map, or another indication via a user interface provided by user interface manager 550. User interface manager 550 receives the indications and converts each of them to a latitude and longitude using conventional techniques and a conventional map database. User interface manager 550 adds such information to a routing record it builds and provides a pointer to the routing record to routes identifier 560. In one embodiment, the user may specify the type of travel desired using a user interface provided by user interface manager 550. User interface manager 550 adds the type of travel to the routing record.

When it receives the pointer, routes identifier 560 uses conventional techniques to identify one or more conventional routes between the source and destination in the routing record corresponding to the pointer it receives. Route identifier 560 uses conventional road routing techniques to identify the route or routes as described above. Route identifier 560 provides an indication of each of the routes it identifies into the routing record. In one embodiment, the indication of a route is its signature as described above, though other indications may be used. Route identifier 560 provides the pointer to the routing record to user interface manager 550.

When it receives the pointer, user interface manager 550 provides the pointer to alternate route identifier 562. When it receives the pointer alternate route identifier 562 selects the first route in the route record and identifies, as described above, one or more alternate routes for each route in the routing record and stores in the route record an indication of each alternate route it identifies, associated with the conventional route to which the alternate route applies. In one embodiment, the indications are signatures as described above, though other indications may be used. In one embodiment, alternate route identifier 562 identifies alternate routes for a variety of travel types or travel and user types and stores an indication of the type with the alternate route. In another embodiment, alternate route identifier 562 first requests the travel type from device type identifier 530, which provides it as described above or uses the travel type in the routing record. Alternate route identifier 562 receives the travel type or types and then identifies one or more alternate chains for that type or types as described above, and stores those alternate chains in the routing record corresponding to the pointer it receives. In one embodiment, alternate chains nearby one another are removed from consideration except for the most recently traveled route, the route with the highest confidence score, or a combination of these. Alternate route identifier 562 provides a pointer to the routing record to route merge manager 564.

In one embodiment, if, for a given conventional route, the alternate routes in route cache storage 526 are insufficient for one or more of the types of travel identified by device type identifier 530, route merge manager 564 will provide the travel type and an indication of the conventional route, or a modified version of the conventional route, to route provide manager 660 via radio 510 and radio 610. The indication may be a signature or another form of indication. The modified route may be the route, modified so that the segment containing the destination is not identified to the route provide manager 560, but instead a nearby segment on that route is identified instead. In this manner, route provide manager 660 is not informed of the destination of the user.

When it receives the indication and type, route provide manager 660 identifies in route storage 632 one or more alternate routes of the type received and near the route corresponding to the indication and type received, that have recently been voted, has a high number of recent votes, or has a high confidence score as described above, and provides indications of the alternate route or routes and the dates and times of the recent votes and travel times for each such alternate route to alternate route identifier 562 via radios 610 and 510.

When it receives the indications of the alternate routes and the type and votes, alternate route identifier 562 stores them into the route cache in route cache storage 526 and uses them as described above.

When it receives the pointer, route merge manager 564 merges the alternate chains into the corresponding conventional route in the route record as described above and stores the results as an indication of an alternate route in the route record. The indications may be signatures as described above, or other forms of indications may be used. Merging may involve identifying a nearest point on the conventional route to the ends or a different segment on the alternate chain, and building a path between them, or identifying one or more intersections between the alternate chain and the conventional route, and discarding the components of the alternate chain outside the earliest and latest intersection points. Alternate chains of the same type that have nearby end points to one another may be merged into one another by route merge manager 564 before merging them into the conventional route, either by merging them at intersection points of the two alternate chains as described above, or by building a path between them prior to merging them into the conventional route to build the alternate route. In one embodiment, each alternate chain of the same type is merged into its corresponding conventional route to build an alternate route and in another embodiment, alternate chains are merged into the conventional route one at a time to produce several alternate routes. Route merge manager 564 provides the pointer to the routing record to user interface manager 550.

Display Route or Routes and Monitor for Deviations

User interface manager 550 displays the conventional routes and alternate routes and allows the user to select one of them. In the embodiment in which routes for different types were identified, user interface manager 550 may color code them and display a key to the colors and types of travel to allow the user to select the route corresponding to the type of travel they desire. The type corresponding to the type of travel selected, along with the user identifier of the user, may be provided by user interface manager to device type identifier 530 or server type manager 622, which record the date, time, type and user identifier for use in subsequent type of travel identifications for that user.

User interface manager 550 provides an indication (e.g. the signature, or another form of indication of the route) of the route the user selects to tracking manager 570, which receives signals from GPS subsystem 580 indicating the position of the user. As noted, GPS subsystem 580 includes a conventional GPS subsystem that receives GPS signals and determined latitude and longitude from those signals, outputting both. Tracking manager 570 provides the current position, the indication of the selected route from the current position to the indicated destination, and driving directions from the current position to the destination for the selected route to user interface manager 550, which displays the driving directions, and the location of the user on a display 590, along with a map that shows the remainder of the route. Display 590 may include a conventional display, and associated conventional driver circuitry.

In the event that the user deviates from the selected route, but remains within a threshold distance to the selected route, tracking manager 570 identifies a path back to the route in the manner described herein and provides driving directions and a signature or other indication of the path to a nearby point on the route, and then along the route from that point to the destination, and provides the current location the signature and the driving directions to user interface manager 550, which displays them as described above. Tracking manager 570 also indicates to user interface manager 550 the portion of the path that is off the route, so that display manager 550 can display it differently, for example, using a different color. Display manager 550 may also provide s different user interface when such an indication is received, for example, asking the user if the user would like to start a new route.

If tracking manager 570 determines the current location is more than the threshold difference, tracking manager 570 signals user interface manager 550. User interface manager 550 responds to the signal by starting again, using the current location and the most recently entered destination received as described above, and the process described herein begins again. In one embodiment, if the user was to enter the type of travel or select a route from one of several types, only the most recently entered type is used to select routes to the user. The user may override the destination or other settings via a user interface provided by user interface manager 550.

Device to Device Communication

In one embodiment, the devices provide one another information from their route caches directly from one device to another, and the receiving device incorporates the information into its route cache. Alternate chain information from a different device's route cache may be received in response to a request for such information, or it may be provided or exchanged in response to two devices coming into contact with one another.

When coming into contact triggers the providing of alternate chain information, the alternate chain information from the route cache may be provided, at least initially for the area nearby the two devices, or it may be provided for the area but beginning with the information related to the direction of each device.

The alternate chain information may, in any embodiment, may include or start with information related to the currently applicable route to the specified destination from the current location of each device, either or both of which having been provided with the request. After the initial set of information is exchanged or provided, additional information may be provided to the extent that communications between the devices remain in place. In this manner, devices in automobiles or otherwise mobile may take advantage of each other's route cache information. Such information can be requested or received at any time, or at such time as the device determines that its own route cache is insufficient to identify alternate chains of the specified type or types or all types.

In one embodiment, information from the server can be more complete than information from another device, and so each device will record the source of the information in its route cache and the date and time information was received from that source. As devices request information from one another, they can check to determine when the last time they received from the server information relevant to the request. The device may send such date and time to the other device, and the other device will respond only with information it received after that date and time in one embodiment. Information may be sent that is in addition to information relevant to the request, and such information may be sent by the device that receives the request beginning with information after the previously specified date and time and then information before the previously specified date and time.

In one embodiment, type information relevant to the current user and current date and time is provided from one or both devices to the other one or more devices with which that device is in communication. The type information may be the type that would be predicted if the currently logged in user (or all users if none are logged in) requested a route at the current date and time and any other types that would be relevant if the user made a request within a threshold period of time. The device sending information from its route cache responds by sending votes for those one or more types before sending information for other types.

In one embodiment, information most recent is sent first by each of the devices, for example, the information that may be for the same approximate time and type of day for the last 5 such days. In one embodiment, when multiple alternate routes are possible, a threshold number of the ones with the highest function result based on the number of votes with more recent votes weighted more heavily (along with optional other factors, such as the travel time of the route when the type of travel includes the fastest route) are selected for display to the user. Thus sending the most recent information first ensures that it will be received and used in not only identifying alternate routes, but selecting which routes are actually displayed to the user.

In this manner, the most pertinent information can be sent first, so that if the connection between two devices is brief, the most pertinent information is transferred first. In one embodiment, one device receives its most pertinent information from the other device, and then sends the other device information most pertinent to that device, and then the devices exchange information less pertinent in a back and forth fashion. In one embodiment, the server also provides information in a similar sequence so that if the connection is lost, the device will have the most pertinent information.

In one embodiment, other devices may monitor the communications and accept such information into their own route caches. Devices that have recently received a request for a route for which information in their route caches does not meet the criteria described herein may indicate a higher priority, so that other devices respond to that device in the manner described herein and the remaining devices first accept responses into their route caches.

In one embodiment, information is received regarding routes near the current locations of the devices as a low priority process. The information may be requested or simply received from other nearby devices without any specific request. Each device may continuously attempt to establish communications with other devices and if communications are established, information about the area may be provided, or it may be provided in response to a request as described herein.

So for example, votes corresponding to types and travel times for an alternate chain may be sent with the signature of the chain only if such votes and travel times are after the date and time specified in the request. In one embodiment, a signature of the chain is provided with such information, but if no such information for an alternate chain is timestamped after the date and time specified in the request, even the signature for that alternate chain would not be provided in one embodiment.

The requesting device receives such information and stores it into its route cache. In one embodiment, information in each devices route cache includes the device identifier that sourced it (i.e. the device that traveled the route and initially stored it into its route cache). For example, travel times and votes may include not only the date and time it was sent, but also the device identifier from which such information was sourced. Such information is provided to the server or another device when each device provides such information to the server as described herein. The server or other device stores such device identifier and provides it with the other information as described herein, though in one embodiment, no server is used. The receiving device attempts to locate the same information in its route cache before storing it by matching the device identifier of the sourcing device and date and time with the corresponding information in its route cache, and discarding matched information, because it already has it. In one embodiment, unmatched information is stored in the circular buffers described herein in date and time order, so that the oldest information is not retained. Information received as described herein may be added to a given buffer in reverse chronological order and logically linked in the same order so that information does not get added and then removed.

Figure 8:
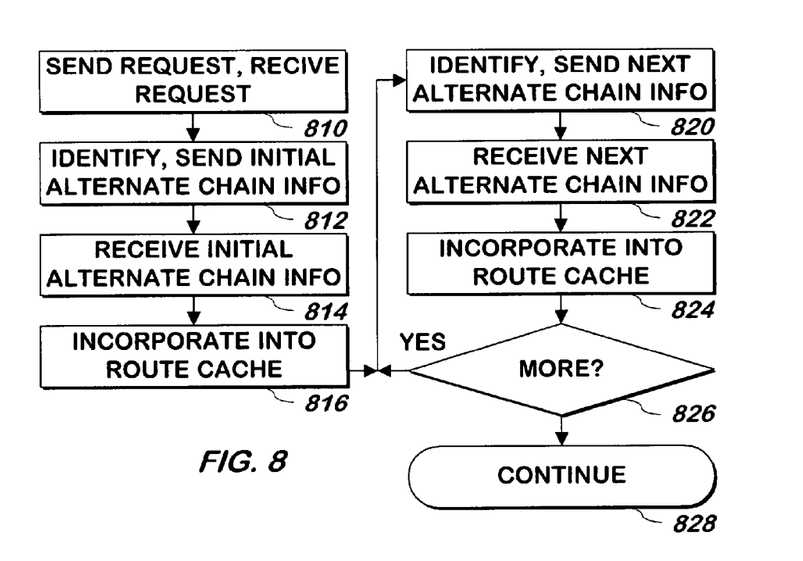
FIG. 8 is a flowchart illustrating a method of communicating alternate chain information from one device to another according to one embodiment of the present invention.

Referring now to FIG. 8, a method of communicating route cache information, including any or all of the information regarding alternate chains is shown according to one embodiment of the present invention. The method may start at step 810 in response to one or more requests or at step 812 or 814 in response to detection of communication with another device or not in response to any such detection. Some steps may be omitted. In one embodiment, the method may be performed between steps 318 and 320, before step 310 or before or after any of the steps of FIGS. 2A, 2B and 3.

A request is sent as described above and/or received as described above to and/or from two or more devices. Initial alternate chain information is identified and sent 812 and or received 814 as described above and any such information received information is incorporated 816 into the receiving device's route cache for use as described herein. A next set of alternate chain information is identified and sent 820 and/or received 822 as described above and any such received information is incorporated 824 into a device's route cache for use as described herein. If there is more information to be sent 826, the method continues at step 820 and otherwise the method of FIG. 2B continues 828.

Route merge manager 564 may provide a request to one or more other devices via radio 510 and the radio 510 in the other device or devices either in response to an insufficient amount of alternate chains in the route cache or upon receipt of the routing record. The radio in each other device forwards the request to route provide manager 540 which provides the alternate chain information from the route cache as described above, and may periodically request the current location from GPS subsystem 580 and provide such information not in response to any request as described herein. Radio 510 in the receiving device will provide the alternate chain information received to route cache manager 524, which stores some or all of it into the route cache as described herein.

It is noted that there may be many devices and one or more servers communicating as described herein. Alternate chain information may include anything described herein as being stored in a route cache.

What is claimed is:
1. A mobile device, comprising:
a processor;
a wireless network interface coupled with the processor for transmitting data to and receiving data from a wireless network;
a receiver of satellite positioning signals and capable of outputting position information, representative of a position of the mobile device, for use by the processor; and
a memory coupled with the processor, the memory storing instructions for programming the processor to perform a method, comprising:

using the position information to determine a first segment and a last segment of each road traveled by the mobile device on a route, representing each first road segment and last road segment with a respective signature, concatenating the respective signatures to form a signature for the route, and transmitting the signature for the route from the mobile device via the wireless network interface.

2. The mobile device of 1, wherein the method further comprises transmitting a travel time on the route represented by the route signature.

3. The mobile device of 1, wherein the method further comprises transmitting travel times for portions of roads represented by the first road segment and last road segment signatures concatenated in the route signature.

4. The mobile device of 1, wherein the respective signatures of the first road segments and the last road segments comprise an identifier of the road of which that segment is a part, and a portion identifier representative of a location on the road of that segment.

5. The mobile device of 1, wherein the method further comprises storing a plurality of route signatures in the memory, and conditioning the sending of the route signature based on absence of the route signature in the memory.

6. The mobile device of 1, wherein each of the respective signatures of the first road segments and the last road segments comprises a numbers of bits responsive to a length of the road of which that segment is a part.

7. The mobile device of 1, wherein each road segment signature comprises an identifier of the road of which that segment is a part, and a portion identifier representative of a location on the road of that segment.

8. The mobile device of 1, wherein the method further comprises storing a plurality of route signatures in the memory with travel time information, and conditioning the sending of the route signature based on difference between the stored travel time and a current travel time.

9. The mobile device of 1, wherein the method further comprises recording, in the memory, a vote for each road segment comprised in the route identified by route signature.

10. A method for performance in a mobile device, comprising:

obtaining position information for the mobile device representative of a position of the mobile device;

determining a segment of a road corresponding to the position of the mobile device;

repeating the obtaining and determining for each road segment comprised in a route taken by the mobile device;

determining representative road segment signatures from which each portion of road traveled by the mobile device on the route can be determined;

concatenating the determined road segment signatures into a route signature; and transmitting the route signature from the mobile device through a wireless network interface for reception by a server.

11. The method of 10, further comprising transmitting a travel time on the route represented by the route signature.

12. The method of 10, further comprising transmitting travel times for portions of roads represented by the first road segment and last road segment signatures concatenated in the route signature.

13. The method of 10, further comprising storing a plurality of route signatures in the memory, and conditioning the sending of the route signature based on absence of the route signature in the memory.

14. The method of 10, wherein each of the respective signatures of the first road segments and the last road segments comprises a number of bits responsive to a length of the road of which that segment is a part.

15. The method of 10, further comprising storing a plurality of route signatures in the memory with travel time information, and conditioning the sending of the route signature based on difference between the stored travel time and a current travel time.

16. The method of 10, further comprising recording, in the memory, a vote for each road segment comprised in the route identified by route signature.

17. A computer readable medium storing computer executable instructions for configuring a processor to perform a method, comprising:

obtaining position information for a mobile device representative of a position of the mobile device;

determining a segment of a road corresponding to the position of the mobile device;

repeating the obtaining and determining for each road segment comprised in a route taken by the mobile device;

determining representative road segment signatures from which each portion of road traveled by the mobile device on the route can be determined;

concatenating the determined road segment signatures into a route signature; and transmitting the route signature from the mobile device through a wireless network interface for reception by a server.

18. The computer readable medium of 17, wherein the method further comprises storing a plurality of route signatures in the memory, and conditioning the sending of the route signature based on absence of the route signature in the memory.

19. The computer readable medium of 17, wherein each of the respective signatures of the first road segments and the last road segments is represented in the computer readable medium with a respective number of bits responsive to a length of the road of which that segment is a part.

20. The computer readable medium of 17, wherein the method further comprises recording, in the memory, a vote for each road segment comprised in the route identified by route signature.

* * * * *